United States Patent [19]

Dinslage

[11] Patent Number: 4,732,298
[45] Date of Patent: Mar. 22, 1988

[54] WITHDRAWAL APPARATUS

[76] Inventor: Wilfried Dinslage, Muhlenstrasse 16, 5161 Merzenich, Fed. Rep. of Germany

[21] Appl. No.: 877,853

[22] Filed: Jun. 24, 1986

[30] Foreign Application Priority Data

Jun. 24, 1985 [DE] Fed. Rep. of Germany ....... 3522521

[51] Int. Cl.⁴ ................................................. B67B 7/24
[52] U.S. Cl. ...................................... 222/83; 222/556; 137/68.1; 251/306
[58] Field of Search ...................... 137/240, 241, 68 R; 251/297, 306; 222/80, 81, 83, 89, 148, 556, 5

[56] References Cited

U.S. PATENT DOCUMENTS

| | | | |
|---|---|---|---|
| 646,104 | 3/1900 | Faber | 137/240 |
| 2,912,218 | 11/1959 | Stillwagon | 251/306 |
| 2,936,778 | 5/1960 | Stillwagon | 251/297 |
| 3,039,482 | 6/1962 | Goldberg | 137/68.1 |
| 4,475,566 | 10/1984 | Haines | 222/81 |
| 4,624,392 | 11/1986 | Malpas et al. | 222/83 |

FOREIGN PATENT DOCUMENTS 989364  5/1976  Canada ................................. 222/148

Primary Examiner—H. Grant Skaggs
Attorney, Agent, or Firm—Robert F. Ziems

[57] ABSTRACT

Withdrawal apparatus or dispenser for the withdrawal of a flowable product from a container, the dispenser being positionable on an outlet plug of the container, and comprising a pipe-shaped withdrawal channel, which can be closed by a closure element. The closure is formed by a plate-shaped closure flap which is rotatable around an axis piercing the withdrawal channel and being arranged orthogonally thereto, the closure flap being sealed with respect to the withdrawal channel by a surrounding or ring-shaped elastic seal.

12 Claims, 5 Drawing Figures

WITHDRAWAL APPARATUS

BACKGROUND OF THE INVENTION

This invention relates to an apparatus for withdrawing a flowable product from a container, and more particularly, it concerns such a withdrawal apparatus which can be positioned onto an outlet plug connected to the container for withdrawal of the container contents through a tube-shaped withdrawal channel in which material flow is controlled by a closing element.

In the packing industry, containers such as foil bags having a sealed outlet plug mounted to the bags are increasingly used. For withdrawal, which is usually achieved either by gravity feed of the container contents or by a membrane pump, a closable withdrawal apparatus is positioned onto the outlet plug. The functioning of the known withdrawal apparatus, or dispenser, is unsatisfactory, particularly when there are substances in the container which are sensitive to the environment or environment polluting and thus require careful sealing from the environment. Further problems arise when coarse or adhesive products, such as jam, must be withdrawn.

A particular problem arises with regard to containers in which the outlet plug must seal the inner part of the container hermetically against the environment during transportation. This sealing is either achieved by a wall of the container onto which the outlet plug is welded or by a special plastic closure plate welded into the outlet plug. If this sealing arrangement must be opened before positioning the withdrawal apparatus onto the container, two essential disadvantages result. Firstly, part of the product may flow out when placing the withdrawal apparatus on the container, provided that the container is in a particular position. Secondly, it is no longer possible to sterilize the inner parts of the withdrawal apparatus and the outlet plug after the withdrawal apparatus has been positioned, which is of substantial importance when there is sensitive organic material packed in the container, such as food.

SUMMARY OF THE INVENTION

It is an object of the present invention to provide a withdrawal apparatus with good sealing from the environment and with simple and reliable operation.

According to the invention, a precisely working sealing between the inner part of the container and the environment is obtained. Furthermore the use of a rotatable closure flap allows the withdrawal of either a small dosage of the container contents or, if desired, a rapid withdrawal of the container contents may be effected by adjusting the closure plate to be parallel with the withdrawal channel, thus providing a large cross section for the outflow of the product. Although facilitating small dosage withdrawals, the apparatus according to the invention fulfills its function also in cases of the withdrawal of coarse and/or adhesive materials. According to a preferred embodiment of the invention, the support of the closure flap is achieved by stub axles which are integrally connected to the closure flap or which are welded therewith. Preferably, the bearings of the stub axles are achieved in a way that the rotation axis of the closure flap coincides with a separating groove in the housing of the withdrawal apparatus, thus making the mounting of the closure flap considerably easier. In this embodiment, the circumferential sealing is preferably fitted into the housing.

The invention also embodies a tubular knife shell in the withdrawal channel, the length of which approximately corresponds to the distance between a frangible sealing plate of the outlet plug and the rotatable closure flap and which is provided with a knife blade at the end facing the outlet plug. With such an arrangement, it is possible to press the knife shell, while turning the closure flap, in such a way on the sealing plate of the outlet plug so that the latter is cut by the knife. Since the knife shell is tubularly shaped the flow of the product is only negligably impeded by the withdrawal channel and the knife shell, respectively.

When the outlet plug is provided with a transverse stiffening rib, the knife shell may be adapted to the remaining cross section of the outlet plug. According to a preferred embodiment, a transverse plate is arranged in the withdrawal channel to prevent the knife from escaping into the container during the cutting process. In the case of a sterilizing withdrawal apparatus, the function of the transverse plate is served preferably by the inlet tube for the sterilizing liquid or the sterilizing vapor.

When a sterilizing liquid or hot vapor must be introduced into the withdrawal apparatus from an outside supply, a suitable venting outlet must be provided. According to a preferred embodiment of the invention, particularly suited for the application in hot vapor sterilization, the knife shell is tapered at one side at the end thereof facing the closure flap so that the closure flap can be rotated through a limited angle to open the withdrawal channel without causing the sealing plate of the container outlet plug to be cut through. This embodiment allows the hot vapor introduced through the inlet bore to be easily vented via the partially open closure flap.

When the withdrawing apparatus must be operated for a longer time, such as several weeks, a separating groove in the housing of the withdrawing apparatus and the sealing between the withdrawal apparatus and the outlet plug are preferably formed as a channel between the two seals in which the sterilizing liquid flows. By means of this arrangement, bacterial growths through the seals may be prevented. The use of corresponding inlet and outlet bores in that case allows construction of the withdrawal apparatus in a way that continuous circulation of the sterilizing liquid is made possible.

According to a further preferred embodiment the operation of the closure flap may be protected by a shaped protecting element. This prevents the withdrawal apparatus from being opened unintentionally or causing the knife shell to penetrate into the frangible sealing plate accidentally.

Further features, advantages and fields of application of the present invention will be apparent from the following description of embodiments with reference to the drawings in which like parts are designated by like reference characters.

DETAILED DESCRIPTION OF THE PREFERRED EMBODIMENTS

Figure 1:
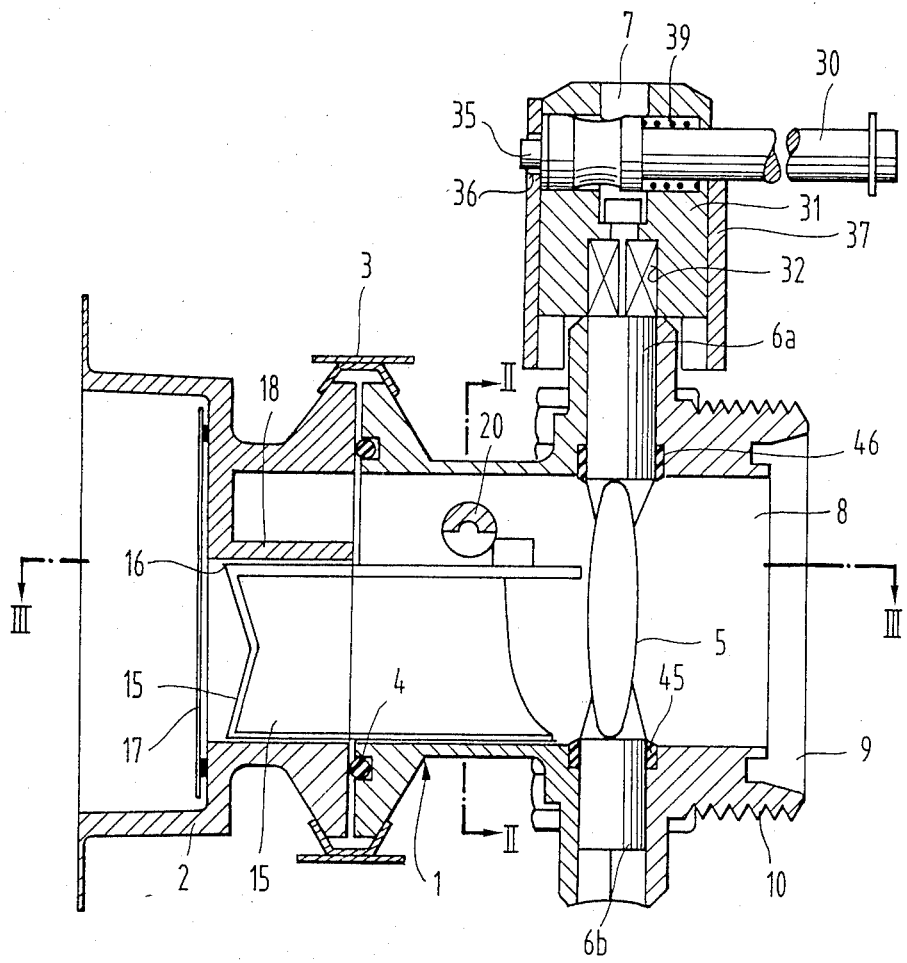
FIG. 1 a cross section of a first embodiment of the withdrawal apparatus according to the invention taken on lines I—I in FIG. 2.
Figure 2:
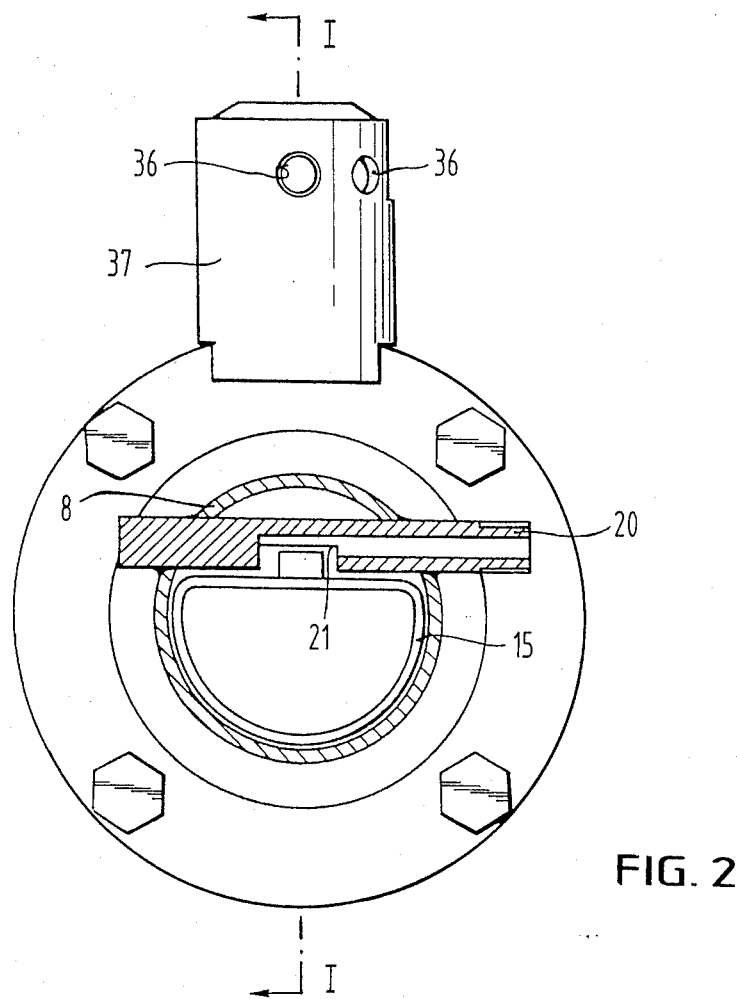
FIG. 2 a cross section of the embodiment according to FIG. 1 along the line II—II in FIG. 1.

In FIG. 1, a first embodiment of the present invention is shown in cross-section. The dispenser section of the apparatus is designated by the reference numeral 1 and shown positioned on the withdrawal conduit or plug 2 of the container (not shown) and connected therewith solidly by a connector 3. In the dispenser 1, a closure flap 5 is provided and is supported by stub axles 6a and 6b journalled in the housing. The stub axles and closure flap 5 are welded to each other. The axis of the bore for the bearing for the stub axles coincides with a separating groove 7 for the housing so that the closure flap 5 can be easily and readily mounted. The withdrawal channel 8 closed by the closure flap 5 is provided with a circular cross section, as can be seen in FIG. 2. The end of the dispenser 1 facing away from the container withdrawal plug 2 is provided with a conical portion 9 and an external thread 10, so that a correspondingly shaped outlet or also a correspondingly shaped connection to a withdrawal pump (not shown) can be mounted thereon.

A tube-shaped knife shell 15 is disposed in the withdrawal channel 8, and this knife shell 15 can be moved by the closure flap 5 toward the withdrawal conduit or plug 2 in such a way that the knife edge 16 pierces the closure plate or seal 17 provided in the plug 2. Since the withdrawal plug 2, in the example shown, is provided with a reinforcing ridge 18, the knife shell is shaped in such a way that it is adapted to the cross section to the remaining opening of the outlet plug 2.

Figure 4:
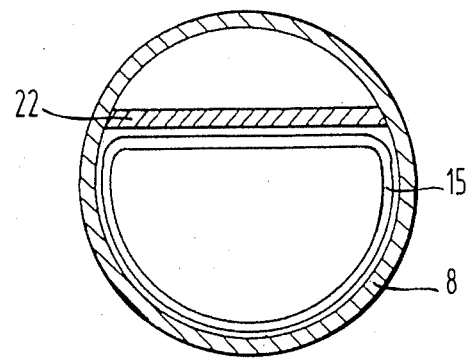
FIG. 4 a cross section of a further embodiment of the invention.

In the dispenser section 1, a pipe 20 is welded and through which a disinfectant liquid or hot steam can be passed into the interior of the withdrawal apparatus or dispenser 1. The disinfectant or hot steam flows from this pipe through the opening 21 (FIG. 2). The pipe 20 also forms a stop for the knife shell 15 to prevent escaping movement of the knife shell into the container during the piercing of the closure plate 17. If the dispenser is not designed for sterile withdrawing, then instead of the injection pipe 20, a ridge 22 can be used as shown in FIG. 4.

Movement of the closure flap 5 is effected by an operating rod 30 which engages the bore of a linking element or guide 31. The guide 31 is connected via a square aperture 32 with a corresponding square rod on the stub axle 6a. The operating rod is provided with a peg 35 which engages a corresponding setting bore 36 of the setting shell 37. The setting shell 37 is fixed with the dispenser and, as such, cannot rotate. The peg 35 of the operating rod 30 is pressed by means of a spring 39 into the setting bore 36. During handling, the peg 35 can be moved by a corresponding movement of the operating rod 30 against the force of the spring 39 out of the setting bore 36, so that a rotation of the guide and thus of the stub axle 6a, and the closure flap 5 may be achieved.

Figure 3:
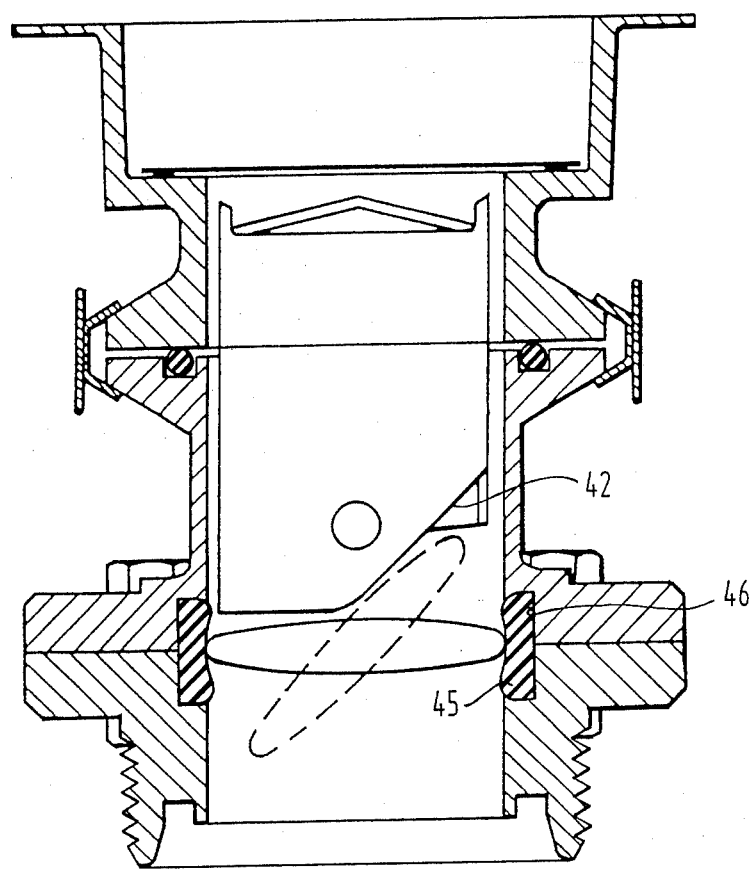
FIG. 3 a cross section of the embodiment according to FIG. 1 along the line III—III in FIG. 1.

As can be seen in FIG. 3, the knife shell 15 at the end facing the closure flap 5 is provided with a slope or is slanted on one side. This slanting allows the rotation of the closure flap 5 by a small angle into the dotted position shown in FIG. 3 without having the knife shell 15 punch the closure plate 17. The closure flap 5 can be set in this position by a corresponding bore (not shown) in the adjusting shell 37 for the peg 35.

Disinfection of the withdrawal section 1 can then be carried out in such a manner that where the dispenser 1 is initially positioned on the outlet plug 2 and attached via the connector 3, the closure flap 5 may be rotated into the position shown in dotted lines in FIG. 3 without moving the cutter into the seal plate 17. Then hot steam can be injected to disinfect the outer portion of the withdrawal plug 2 and the inner portion of the dispenser 2, the knife shell 15 and the closure flap 5. The steam exits through the slightly opened closure flap 5. The closure flap is then rotated in the opposite direction so that the punching of the closure plate 17 by the knife shell 15 occurs.

The closed condition of the closure flap 5 is maintained by a seal 45 inserted into a corresponding groove 46 in the housing of the dispenser 1, which seal also has openings for the stub axles 6a and 6b.

Figure 5:
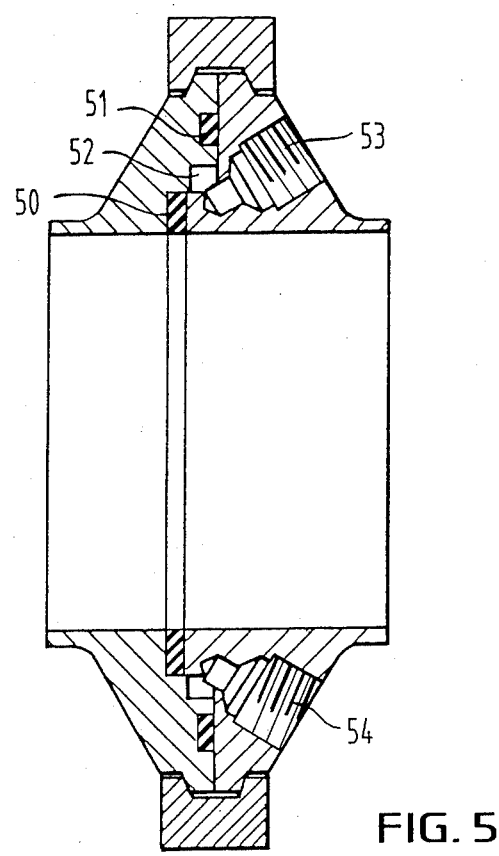
FIG. 5 the embodiment of the sterile housing seals.

If a sterile withdrawal during several weeks is to be achieved, then the seals have to washed by disinfectant liquid. An embodiment for such a sealing arrangement is shown in FIG. 5. The dispsenser is sealed by means of a first seal 50 toward the outside. In addition a second seal 51 is provided which seals the channel 52 for the flow of the disinfectant. The disinfectant liquid is supplied via a supply bore 53, and flows off through a withdrawal bore 54. With this system, it is possible to secure the connection between the outlet plug and the attached dispenser while preventing growth of bacteria. By providing a corresponding arrangement of the seal 45 of the closure plate 5 this seal also can be protected by a disinfectant liquid.

I claim:

1. Apparatus for withdrawing a flowable product from a container having an outlet plug, the apparatus being positionable on the outlet plug connected to the container and being provided with a tube-shaped withdrawal channel which can be closed by a closure element, said apparatus comprising:

a plate-shaped closure flap (5) to define the closure element, said flap being rotatable on an axis diametric to the withdrawal channel (8), said closure flap being sealed with respect to the withdrawal channel (8) by a surrounding elastic seal (45); and, a pipe-shaped knife shell (15) in said withdrawal channel, said shell having a knife edge (16) directed toward the outlet plug (2) and characterized in that a taper (42) is provided at the end facing toward the closure flap (5), which taper is formed in such a way that the closure flap (5) can be partially opened without moving the knife shell (15) toward a closure plate (17).

2. Apparatus for withdrawing a flowable product from a container having an outlet plug, the apparatus being positionable on the outlet plug connected to the container and being provided with a tube-shaped withdrawal channel which can be closed by a closure element, said apparatus comprising:

a plate-shaped closure flap (5) to define the closure element, said flap being rotatable on an axis diametric to the withdrawal channel (8), stub axles (6a, 6b) extending from the closure flap (5) define the bearing of said closure flap (5), the rotational axis of the stub axles coinciding with a dividing slit (7) in the apparatus, said closure flap being sealed with respect to the withdrawal channel (8) by a surrounding elastic seal (45); and, a pipe-shaped knife shell (15) in said withdrawal channel, said shell having a knife edge (16) directed toward the outlet plug (2) and characterized in that a taper (42) is provided at the end facing toward the closure flap (5), which taper is formed in such a way that the closure flap (5) can be partially opened without moving the knife shell (15) toward a closure plate (17).

3. Apparatus for withdrawing a flowable product from a container having an outlet plug, the apparatus being positionable on the outlet plug connected to the container and being provided with a tube-shaped withdrawal channel which can be closed by a closure element, said apparatus comprising:

a plate-shaped closure flap (5) to define the closure element, said flap being rotatable on an axis diametric to the withdrawal channel (8), stub axles (6a, 6b) extending from the closure flap (5) define the bearing of said closure flap (5), the rotational axis of the stub axles coinciding with a dividing slit (7) in the apparatus, said closure flap being sealed with respect to the withdrawal channel (8) by a surrounding elastic seal (45), the surrounding seal (45) is arranged in a surrounding recess (46) and is provided with openings for the stub axles (6a, 6b); and, a pipe-shaped knife shell (15) in said withdrawal channel, said shell having a knife edge (16) directed toward the outlet plug (2) and characterized in that a taper (42) is provided at the end facing toward the closure flap (5), which taper is formed in such a way that the closure flap (5) can be partially opened without moving the knife shell (15) toward a closure plate (17).

4. Apparatus for withdrawing a flowable product from a container having an outlet plug and a frangible sealing plate, the apparatus being positionable on the outlet plug connected to the container and being provided with a tube-shaped withdrawal channel which can be closed by a closure element, said apparatus comprising:

a plate-shaped closure flap defining the closure element, said flap being rotatable on an axis diametric to the withdrawal channel, said closure flap being sealed with respect to the withdrawal channel by a surrounding elastic seal; and, a pipe-shaped knife shell in said withdrawal channel, said shell having a knife edge directed toward the outlet plug and characterized in that a space is provided at the end facing toward the closure flap (5) in such a way that the closure flap (5) can be partially opened without moving the knife shell (15) toward the frangible sealing plate (17).

5. Apparatus in accordance with claim 4, characterized in that stub axles (6a, 6b) extending from the closure flap (5), define the bearing of said closure flap (5) the rotational axis of the stub axles coinciding with a dividing slit (7) in the apparatus.

6. Apparatus in accordance with claim 5, characterized in that the surrounding seal (45) is arranged in a surrounding recess (46) and is provided with openings for the stub axles (6a, 6b).

7. Apparatus in accordance with any one of claims 4, 5 or 6, characterized in that the apparatus is provided with a stop (20, 22), which prevents an escaping movement of the knife shell (15).

8. Apparatus in accordance with ay one of claims 4, 5 or 6, characterized in that means for supplying a disinfectant or hot steam is provided.

9. Apparatus in accordance with claim 4 characterized in that the closure flap can be locked in various positions by means of a shaped protecting element (35).

10. Apparatus in accordance with claim 4 characterized in that between the outlet plug and apparatus parts to be sealed, a channel (52) is provided for, through which a disinfectant can flow, said channel being sealed by means of a second seal (51).

11. Apparatus in accordance with claim 4 characterized in that the withdrawal channel (8) has circular cross section.

12. Apparatus in accordance with claim 4 characterized in that the withdrawal channel is made from stainless steel.

* * * * *

UNITED STATES PATENT AND TRADEMARK OFFICE
CERTIFICATE OF CORRECTION

PATENT NO.   : 4,732,298

DATED        : March 22, 1988

INVENTOR(S)  : Wilfried Dinslage

It is certified that error appears in the above-identified patent and that said Letters Patent is hereby corrected as shown below:

Claim 8, line 1, change "ay" to --any--.

Signed and Sealed this

Ninth Day of August, 1988

Attest:

DONALD J. QUIGG

*Attesting Officer*  *Commissioner of Patents and Trademarks*